United States Patent [19]
Gillard et al.

[11] Patent Number: 4,611,915
[45] Date of Patent: Sep. 16, 1986

[54] ABSOLUTE DISTANCE SENSOR

[75] Inventors: Calvin W. Gillard; Neal E. Buholz, both of Palo Alto; William M. Wells, III, Stanford, all of Calif.

[73] Assignee: The United States of America as represented by the Secretary of the Air Force, Washington, D.C.

[21] Appl. No.: 501,945

[22] Filed: Jun. 7, 1983

[51] Int. Cl.⁴ .............................................. G01B 9/02
[52] U.S. Cl. .................................... 356/349; 356/358
[58] Field of Search ....................... 356/4.5, 349, 358

[56] References Cited

U.S. PATENT DOCUMENTS

| | | | |
|---|---|---|---|
| 3,359,851 | 12/1967 | Lipschutz et al. | 88/14 |
| 3,458,259 | 7/1969 | Bagley et al. | 356/106 |
| 3,656,853 | 4/1972 | Bagley et al. | 356/106 |
| 3,790,898 | 2/1974 | Gudmundsen et al. | 331/94.5 |
| 3,836,256 | 9/1974 | Peters | 356/109 |
| 4,355,899 | 10/1982 | Nussmeier | 356/349 |
| 4,355,900 | 10/1982 | Nussmeier | 356/356 |
| 4,360,271 | 11/1982 | Downs et al. | 356/351 |
| 4,492,464 | 1/1985 | Bourdet et al. | 356/4.5 |

OTHER PUBLICATIONS

Bien et al., "Absolute Distance Measurements by Variable Wavelength Interferometry", *Applied Optics*, vol. 20, No. 3, pp. 400–403, 2/81.
C. W. Gillard et al, "Absolute Distance Interferometry", *Optical Engineering*, Jan./Feb. 1981, vol. 20, No. 1, pp. 129–134.
C. W. Gillard et al, "Progress in Absolute Distance Interferometry", SPIE, Nov. 82, pp. 1–9.

*Primary Examiner*—Davis L. Willis
*Assistant Examiner*—Matthew W. Koren
*Attorney, Agent, or Firm*—Donald J. Singer; Stanton E. Collier

[57] ABSTRACT

The improved Absolute Distance Sensor has achieved presently a resolution of about 0.03 μm (RMS) for measurements over long distances. A two-color, synthetic Michelson interferometer employing a $CO_2$ source is designed to sequentially switch between four sets of R and P line pairs and thereby provide a basis for forming simultaneous equations which are employed to greatly reduce the half wavelength ambiguity typical of single wavelength interferometers.

1 Claim, 7 Drawing Figures

ABSOLUTE DISTANCE SENSOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to distance measuring devices and techniques, and, more particularly, relates to a two-color synthetic Michelson interferometer for optically measuring distance over relatively long paths with resolution to a small fraction of an optical wavelength without the range ambiguity inherent in conventional interferometry.

The origins of employing an optical wavelength, presumed to be a constant, to measure absolute distance stems from the early classical experiments by Michelson and Benoit to measure the international meter in terms of the wavelength of the red line of cadmium. Laser interferometry enhances the precision with which interferometric measurement can be made, but because of its superior coherence length makes possible extended range interferometry, and through precision frequency stabilization provides the basis of an absolute wavelength standard.

The ambiguity of conventional interferometers may be greatly reduced through the use of multiple wavelengths. Measuring absolute distance interferometrically requires that the fringe order number in the interferometer be identified. One would like to employ a multiwavelength source with an ambiguity length longer than the greatest distance to be measured; however, for most practical applications this is unnecessary. Interferometer ambiguity distances large enough to be resolved by some form of a priori measurement are considered acceptable. One technique to extend the interferometer ambiguity distances employs a number of well-characterized, suitably-spaced wavelengths produced by a $CO_2$ laser source operating in the 10.4 $\mu m$ wavelength band. The differences in a selected set of these wavelengths, and the differences in the differences . . . ad infinitum . . . were used to generate a hierarchy of wavelengths whereby, using fractional fringe measurement techniques, and a simple algorithm, distance employing any wavelength in the hierarchy could be established with sufficient accuracy to identify the next lower wavelength order number. By working downward through the wavelength hierarchy (from the longest wavelengths to the optical fringes), distance is ultimately established in terms of a well known optical wavelength, the unit of measure.

Analysis shows that the ideal wavelength hierarchy consists of a geometrical progression of wavelengths of sufficient density so that the fractional fringe measurement resolution of any wavelength in the hierarchy could reliably measure distance to a small fraction of the next lower wavelength. Practically, however, the availability of appropriately spaced wavelengths occurs as an act of nature. The use of isotopes can modify the available wavelengths somewhat, but this would have only a small effect on the desired progression of wavelengths.

One technique of using multiple wavelengths is disclosed in U.S. Pat. No. 4,355,899, entitled "Interferometric Distance Measurement Method" and a device for using this technique is further disclosed in U.S. Pat. No. 4,355,900, entitled "Self-Calibrating Interferometer". This particular device uses two Michelson interferometers to measure an unknown distance.

Another approach uses heterodyne photodetection to provide a basis for quantum-noise-limited operation that gives a high signal-to-noise ratios with a large signal with a small target return power. It further provides for a large variation in signal level and permits the phases (fractional fringes) of the optical signals to be measured electronically at a convenient frequency. Optical offsets necessary for heterodyne operation are provided by several Bragg cells that also serve to spectrally isolate the laser from the target returns which upset the laser's stability.

One optical setup employing heterodyning uses a $CO_2$ laser, emitting power from both ends, where one beam is used to control and stabilize the laser and the other beam split into two beams, one of which is employed in a synthetic interferometer and the other as a local oscillator (LO) beam. Because heterodyne photodetection is used, the local oscillator beam and interferometer beams are frequency offset with Bragg cells and spatially separated. Ordinarily a single frequency translation would suffice but a single Bragg cell generates, in addition to the desired frequency-translated component, a second contaminating component due to a small backward (reflected) acoustical wave. This component has in the past been large enough to impair the phase measurement process. Employing a second Bragg cell at a second frequency provides a basis for isolating this component but increases the complexity. Two detectors are used to detect phases in the two beams which are required because of spatial separation and no frequency offsets.

One element of the prior Absolute Distance Sensor is the "two-color laser" (T-C laser), which is capable of stabilizing and operating simultaneously on any of four sets of two-color pairs (for a total of five different rotational-vibrational lines in the $CO_2$-10.4 $\mu m$ band), and of rapidly switching through the various color pairs by means of a piezoelectric mirror drive and control subsystem. All of the basic features of the T-C laser (its stability, switching capability, line pairing sequence, states-of-operation, switching speed, and derivable wavelength hierarchy) are fundamental to the operation of the Absolute Distance Sensor system.

Progressing through the optical train of the prior Absolute Distance Sensor, separate target/reference sensing beams are established at a beamsplitter and pass in the vicinity of an optical switch (chopper) employed to alternately range to the target and reference legs of the interferometer. Since it is the difference between these measurements that is of interest, phase noise in the electronics and all optics upstream from the beamsplitter is common to both measurements and may be largely cancelled. By making rapid phase measurements and by switching between target and reference at a high rate (240 Hz is used here) significant common mode noise cancellation benefits may be achieved. The target/reference beams leaving the interferometer are made colinear at the beamsplitter, and made congruent with the LO beam at a second beamsplitter, and progress to a grating where the R- and P-lines are separated and directed to separate detectors. The heterodyne photodetected signals are then digitally processed for phase. A 36 MHz clock is started and stopped by axis crossing detectors using target and reference returns from the detected R- and P-carriers as well as an electronic reference signal derived from the Bragg cell drivers, all of which are heterodyned to a convenient working frequency (in this case, 10 kHz). Statistically, the digital error of this scheme is approximately $1:2.8\times10^3$ for each phase measurement. Statistical improvement is achieved by averaging over 10 cycles per phase measurement. Relative times (reference signal period and target return delay times) are directly available in a form convenient for computer input without further processing.

Although the prior Absolute Distance Sensor proved the concept of accurate distance measurement that sensor required an elaborate signal processing scheme and a complex optical system suitable only in the laboratory.

SUMMARY OF THE INVENTION

The instant invention overcomes the problems encountered in the past by providing an improved Absolute Distance Sensor utilizing spectral isolation of the R and P beams, one photo detector and one Bragg cell to result in a more practical Absolute Distance Sensor configuration.

A multi-state two-color $CO_2$ laser in response to an electronic laser controller outputs a carrier beam having a selected pair of lines from the $CO_2$ laser spectrum. This carrier beam is input to a multi-frequency Bragg cell driven by several selected frequencies. The Bragg cell outputs several different R and P line beams that are frequency offset from the carrier. One pair of R and P lines form a local oscillator beam and another pair of R and P lines form an interferometer beam.

The local oscillator beam is input into a detector for measuring phase. The interferometer beam is input into a synthetic Michelson interferometer that has a beam switch that causes the interferometer beam to be returned from a target and reference reflector alternatively. The return target and reference beams are made congruent with the local oscillator beam and also input to the phase detector.

In the improved Absolute Distance Sensor, the synthetic Michelson interferometer is illuminated by each R and P line pair in rapid succession and in a given order. The phase at a convenient heterodyne frequency is measured alternately for each of two beams directed at retroreflectors, one designated "target", the other "reference". The phases are then subtracted, yielding a phase differential or "fractional fringe" indicative of the optical path difference between target and reference lengths. This is done simultaneously for the R and P lines of each pair. Four basic wavelength pairs generated by the laser may be combined to produce the long synthetic wavelengths. These, in turn, provide a means to determine the exact number of 10 $\mu$m wavelengths in the optical path difference. This is accomplished by measuring the optical path difference for each synthetic wavelength (obtain number of wavelengths plus the fractional fringe, beginning with the longest) with sufficient accuracy that a handover to the next shorter wavelength can be accurately done. The process is repeated until the 10 $\mu$m wavelength number and fractional fringe are obtained.

It is therefore an object of this invention to provide an improved absolute distance sensor using spectral isolation to reduce cross talk contamination;

It is another object of this invention to significantly reduce the number of optical components required to make distance measurement;

It is a further object of this invention to provide an improved Absolute Distance Sensor that is capable of practical use.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

Figure 1:
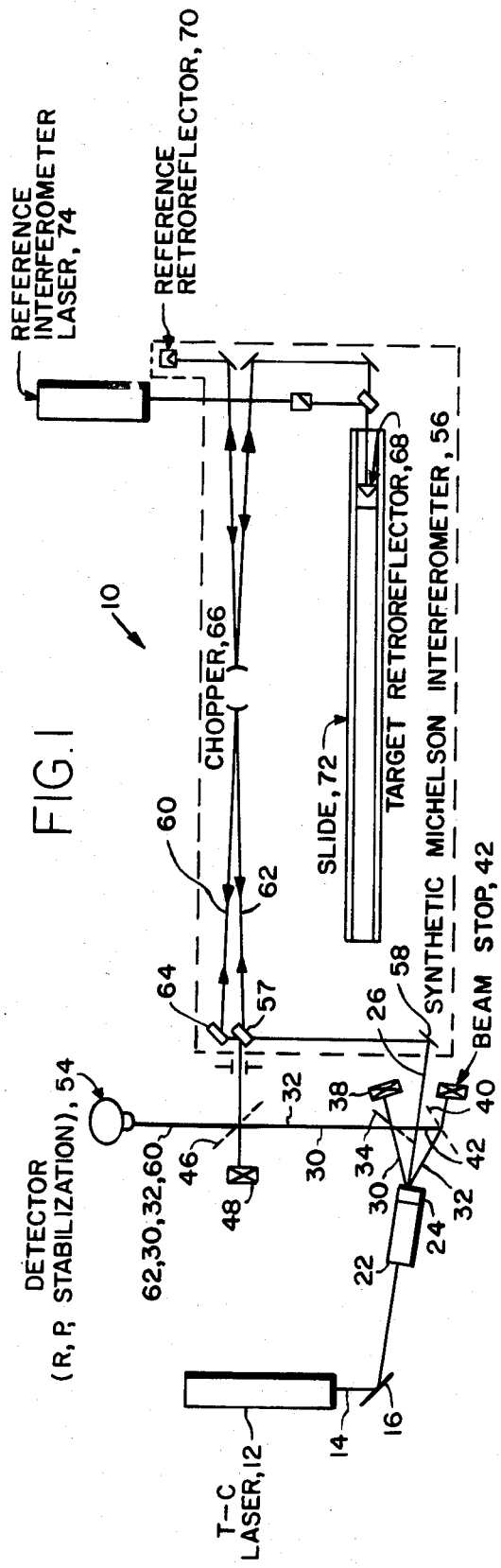
FIG. 1 is a diagrammatic representation of the improved absolute distance sensor of this invention.

Referring to FIG. 1 which illustrates the optical arrangement of an improved absolute distance sensor 10, a four-state two-color $CO_2$ laser 12 outputs a R/P carrier beam 14. Four-state two-color $CO_2$ laser 10 is more fully described in U.S. Pat. No. 4,513,422 entitled "$CO_2$ Laser Stabilization and Switching" issued to the same assignee and is hereby incorporated by reference. A reflector 16 causes beam 14 to enter a multi-frequency Bragg cell 22. Bragg cell 22 outputs multiple beams, not shown, to a beam corrector 24. Beam corrector 24 outputs, in particular, an interferometer beam 26 having offset R and P line beams of about 58 MHz which are collinear and congruent, and local oscillator R and P beams 30 and 32, respectively, having a frequency of 17 MHz and 48 MHz, respectively. These frequency offsets are with respect to the frequency of R and P carrier beam 14.

R beam 30 is incident on a first beam splitter 34 that functions to align beam 30 and to reduce the intensity of LO R beam 30. A first beam stop 38 absorbs the undesired portion of R beam 30. Similarly, P beam 32 is incident on a second beam splitter 40 that functions to align P beam 32 with R beam 30. The undesired part of P beam 32 is absorbed by a second beam stop 42. Then a congruent and collinear R and P beams 30 and 32 are incident on a third beamsplitter 46. The undesired parts of R and P beams 30 and 32 are absorbed by a third beam stop 48. Finally reduced, collinear and congruent R and P beams 30 and 32, shown as one line, are incident on a single detector 54.

Returning to beam corrector 24, interferometer beam 26 enters a synthetic Michelson interferometer 56. Interferometer beam 26 reflects off a mirror 58 and is incident on a fourth beam splitter 57. Interferometer beam 26 as a result of fourth beam splitter 57 divides into a reference beam 62 and a target beam 60. Target beam 60 reflects off a third mirror 64. Then both target beam 60 and reference beam 62 pass through a conventional beam chopper 66 that allows only a return from a target retroreflector 68 or a reference retroreflector 70 to be analyzed. Target retroreflector 68 is mounted on a slide 72. A reference interferometer 74 is used for checkout, but is not required to obtain the distance of concern.

T-C laser 12 is capable of stabilizing and operating simultaneously on any of four sets of two-color pairs (for a total of five different rotational-vibrational lines in the $CO_2$ 10.4 $\mu m$ band), and of rapidly switching through the various color pairs by means of a piezoelectric mirror drive and control subsystem, not shown.

The basic concept behind T-C laser 12 stabilization technique is related to the fact that a linear power exchange exists between the R and P lines as a function of laser frequency in the region of two-color operation. Equalizing the R and P line powers thus provides a laser frequency discriminant which is based on the $CO_2$ molecule and which, in principle, should be absolute. Laser stabilization test data obtained by beating two stabilized nearly identical T-C lasers 12 together indicates that the residual noise of one T-C laser is approximately $\pm 35$ kHz, or 1 part in $0.8 \times 10^9$ per 15 minutes. Short term stability is 1 part in $7 \times 10^9$ per msec.

The signature of T-C laser 12 (dominant resonant frequency as a function of laser cavity length) is chosen to give the desired sequence of R and P lines in the 10.4 $\mu m$ vibrational band. A piezoelectric mirror mount in conjunction with the stabilization circuit adjusts the cavity length to correspond to a chosen segment of the signature. Adjusting the cavity length over a portion of a specific 5 $\mu m$ range allows one to obtain the signature segment shown in FIG. 7. Also shown here are the four color-pairs, the off-line-center stabilized operation points and the four-state switching sequence.

frequencies since they are derived using more than one color pair (non-simultaneous data) and hence are not physically observable frequencies. The sixth and seventh levels are also "synthetic" since they rely upon data obtained from either side of line center (two different color pairs). The wavelength values are calculated from the frequency values using the speed of light. $c = 2.99792(00) \times 10^8$ m sec, and assuming a refractive index, $n = 1$.

Figure 2:
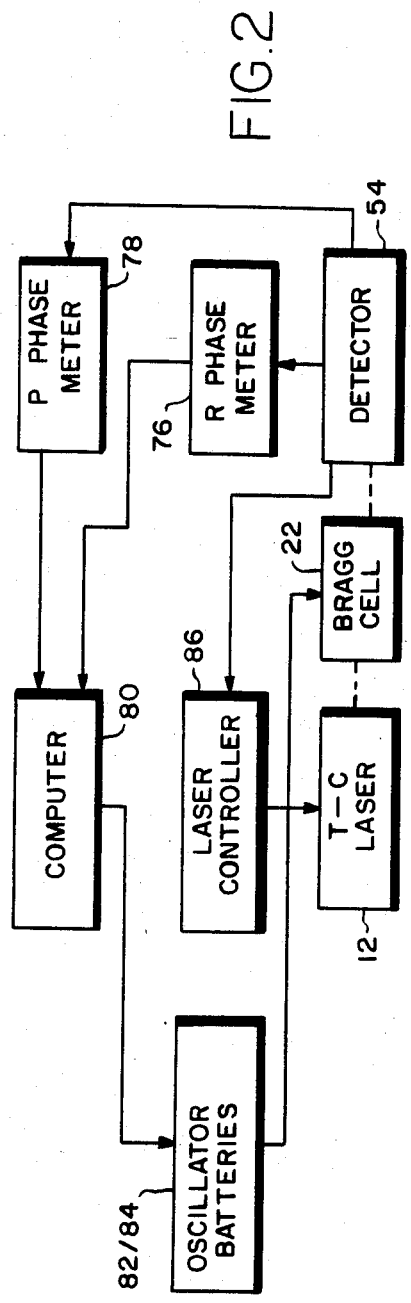
FIG. 2 is a block diagram of the electronics used in the improved absolute distance sensor of this invention.
Figure 3:
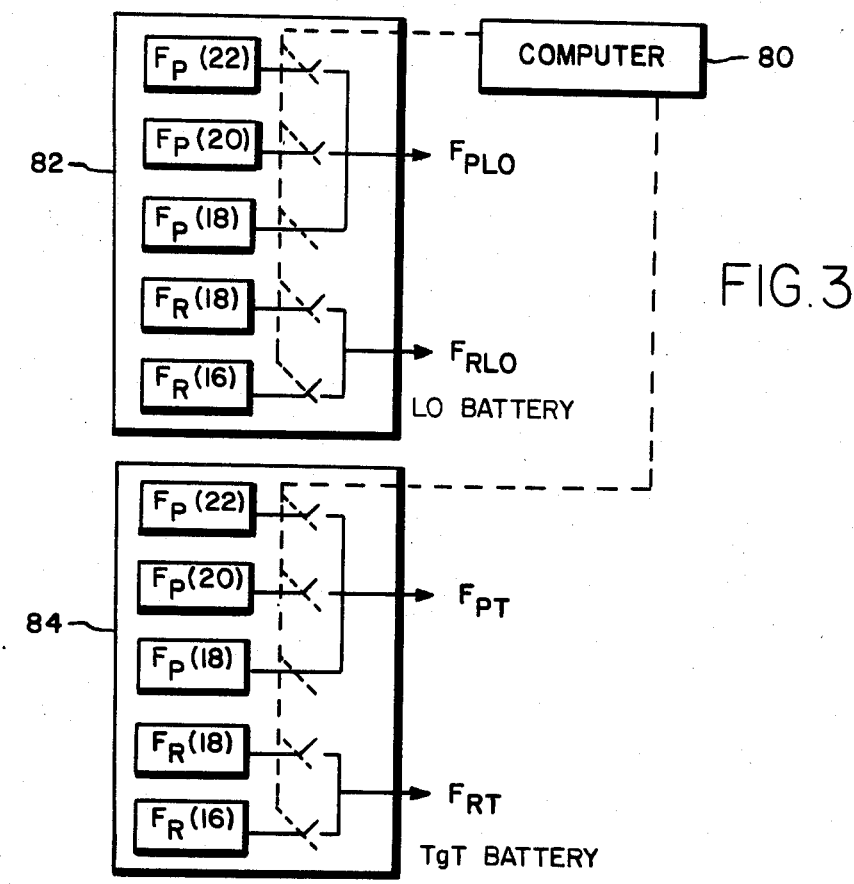
FIG. 3 illustrates oscillators for outputting multidrive frequencies to the Bragg cell.

Signal processing of the R and P lines is accomplished with the electronics shown in FIGS. 2 and 3. As shown in FIG. 2, the output from T-C laser 12 is directed to Bragg cell 22 used to generate local oscillator beams 30 and 32, R and P beams respectively, and interferometer beam 26.

In order to drive Bragg cell 22, predetermined frequencies generated by a LO battery 82 and a Target battery 84, shown in FIG. 3, are applied as determined by a computer 80. Two drive frequencies, $F_{PLO}$ and $F_{RLO}$ separate the R and P beams 30 and 32. The frequency offsets are relative to T-C laser 12 R and P carrier beam 14. Computer 80 is programmed to activate the appropriate oscillators in consonance with a given T-C laser 12 state. Compensation for the effects of the frequency variations on phase measurements and heterodyning take place in the signal conditioning circuitry, not shown, in detector 54, prior to R and P phase meters 76 and 78.

R and P interferometer beam 26 is generated in a similar manner with oscillators. The large electronic spectral separation employed with the LO R and P beams 30 and 32 is not necessary with interferometer

TABLE I

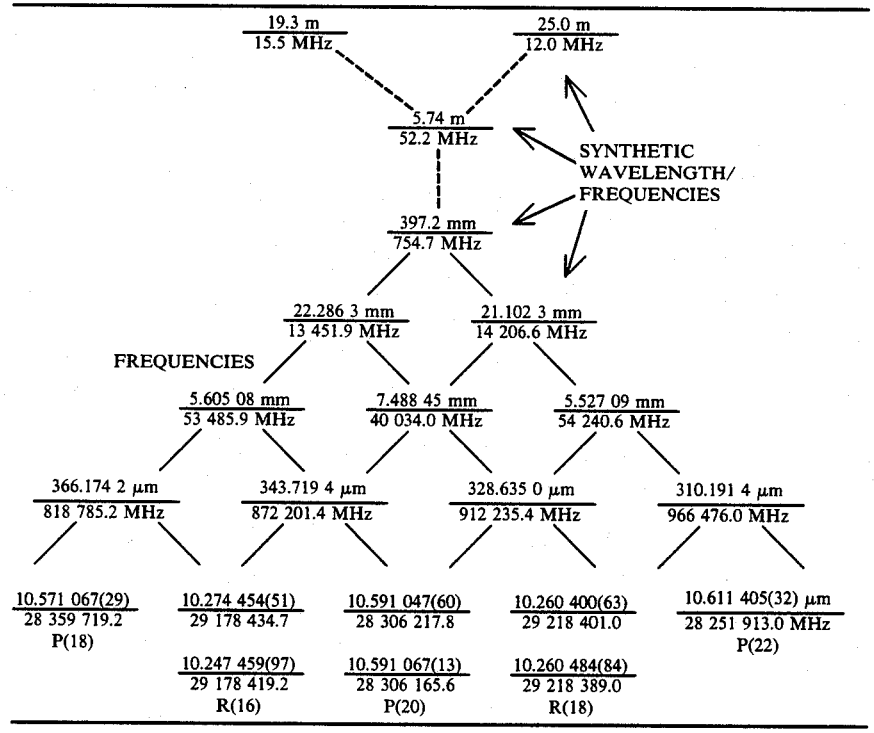

Figure 7:
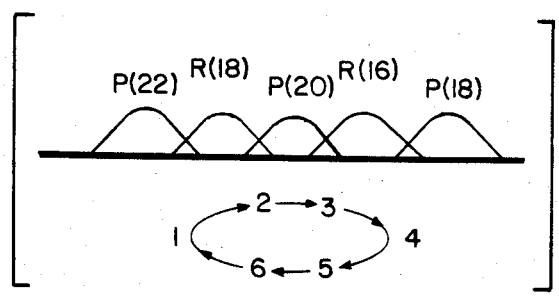
FIG. 7 illustrates switching sequence used in the four-state two-color laser.
Figure 4:
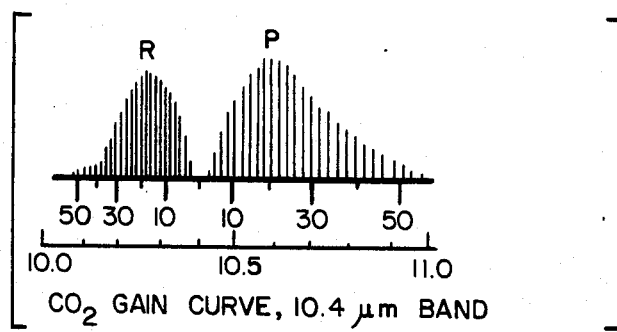
FIG. 4 illustrates the laser $CO_2$ gain curve in the 10.8 $\mu$m band.

Table 1 displays the hierarchy of differential and synthetic frequency lines obtained from the eight optical frequencies shown on the first (bottom most) level. The second level consists of differential (beat) frequencies of the various two-color line pairs (simultaneous data). The third, fourth, and fifth levels are "synthetic"

beam 26. Interferometer beam 26 having closing spaced R and P lines exiting cell 22 are made collinear by appropriate choice of drive frequencies $F_{PT}$ and $F_{RT}$, and are kept colinear by appropriate adjustment to cell 22 drive frequencies derived from a second battery of oscillators 84. The resulting spectrum for both the LO and interferometer beams 30, 32, and 26 are shown in FIG. 7. Beam corrector 24 makes necessary adjusts in beam direction as necessary and is of conventional design.

Figure 6:
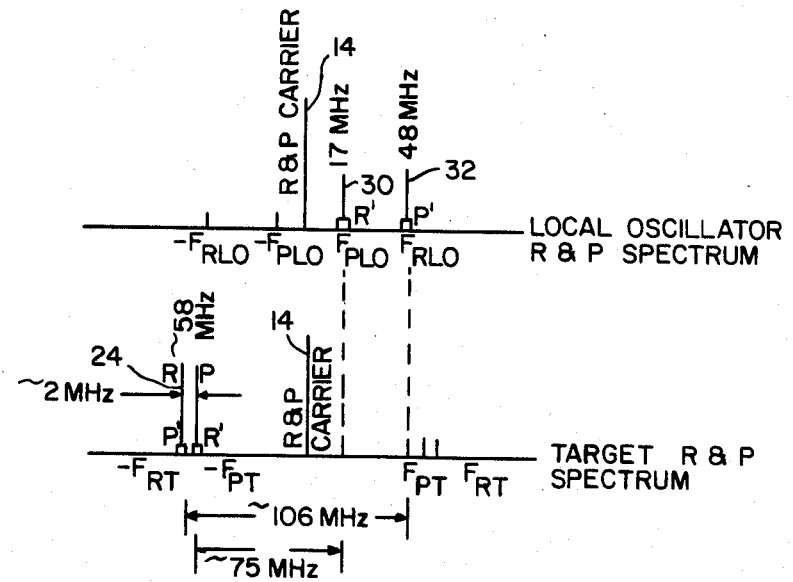
FIG. 6 illustrates the four-state two-color laser frequency/wavelength hierarchy pyramid.

Referring to FIG. 7, R and P carriers are superimposed and the relative offset frequencies of the subcarriers, either R or P, are shown to the same scale. The large separation between R and P LO beams 30 and 32 provides the spectral isolation needed to simultaneously process the R and P target and reference return signals (i.e., measure their phases) without electronic crosstalk contamination. A small frequency separation (~2 MHz) between the R and P interferometer beam 26 is present and is needed to compensate cell 22 for R and P line dispersion (i.e., provide the beam overlap shown in FIG. 6 and also ensure that photo-mixing between the main subcarriers and the contaminating components due to a backward acoustical wave in Bragg cell 22 ($-F_{RLO}$, $-F_{PLO}$, $F_{PT}$ and $F_{RT}$) as well as the forward scattered components, R' and P', in the LO and target directions will be outside the main 106 MHz and 75 MHz data channels. The residual in-band photomixing that does occur in the data channels, however, will be second order and, hence, of no consequence.

Measuring absolute distance interferometrically requires that the fringe order number in the interferometer be identified. One would like to employ a multi-wavelength source with an ambiguity length longer than the greatest distance to be measured; however, for most practical applications this is unnecessary. Interferometer ambiguity distances large enough to be resolved by some form of a priori measurement are considerd acceptable. The basic approach used is to extend the interferometer ambiguity distances employed to a number of well-characterized, suitably-spaced wavelengths produced by a $CO_2$ laser source operating in the 10.4 $\mu$m wavelength band, FIG. 5. The differences in a selected set of these wavelengths, and the differences in the differences ... ad infinitum ... are used to generate a hierarchy of wavelengths, Table 1, whereby, using fractional fringe measurement techniques, and a simple algorithm, distance employing any wavelength in the hierarchy can be established with sufficient accuracy to identify the next lower wavelength order number. By working downward through the wavelength hierarchy (from the longest wavelengths to the optical fringes), distance is ultimately established in terms of a well known optical wavelength, the unit of measure.

Analysis shows that the ideal wavelength hierarchy would consist of a geometrical progression of wavelengths of sufficient density so that the fractional fringe measurement resolution of any wavelength in the hierarchy could reliably measure distance to a small fraction of the next lower wavelength. Practically, however, the availability of appropriately spaced wavelengths occurs as an act of nature. The use of isotopes can modify the available wavelengths somewhat, but this would have only a small effect on the desired progression of wavelengths.

Figure 5:
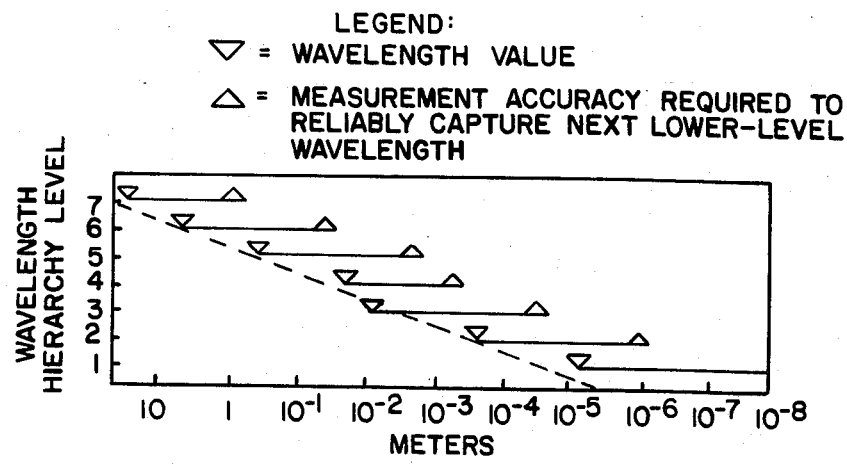
FIG. 5 illustrates wavelength heirarchy used in the two color laser.

FIG. 5 exhibits a wavelength display obtained by selecting a specific path through the values shown in Table 1. A logarithmic scale was employed so that an approximation to a geometric wavelength progression (hierarchy wavelength versus order number) would appear with the wavelength values distributed along a straight line. The dashed line, a visual best fit, shows that the wavelength hierarchy available from the $CO_2$ laser does indeed come remarkably close to a geometrical progression. Also illustrated is the measurement accuracy (shown as the right-hand limit in the overlap between the various wavelengths) required of each wavelength to reliably capture the next lower wavelength in the hierarchy. Fractional fringe measurement techniques have been developed that permit the required measurement accuracy to be realized.

A total of sixteen different paths can be traced through the hierarchy pyramid in Table 1. Four of these paths can be used in improved Absolute Distance Sensor 10, both as a diagnostic for the system and as a means of obtaining information on all eight laser line frequencies. Table II displays these four paths. Eventually, only Path 2 will be used, thus reducing the computer program complexity and increasing computational speed.

TABLE II

| | Wavelength Hierarchy. | | | |
|---|---|---|---|---|
| Level | Path #1 | Path #2 | Path #3 | Path #4 |
| 7 | 25 m | 25 m | 19 m | 19 m |
| 6 | 5.7 m | 5.7 m | 5.7 m | 5.7 m |
| 5 | 397 mm | 397 mm | 397 mm | 397 mm |
| 4 | 21.1 mm | 21.1 mm | 22.3 mm | 22.3 mm |
| 3 | 5.53 mm | 7.49 mm | 7.40 mm | 5.60 mm |
| 2 | 310 $\mu$m | 329 $\mu$m | 344 $\mu$m | 366 $\mu$m |
| 1 | $R_2$ (18) | $R_1$ (18) | $R_2$ (16) | $R_1$ (16) |
| | P (22) | $P_2$ (20) | $P_1$ (20) | P (18) |

Referring to FIG. 2, digital phase meters 76 and 78 determine phase information from the heterodyne photodetected signals of the R and P lines of LO R and P line beams 30 and 32, respectively, and R and P reduced target and reference beams 60 and 62, respectively. This phase information is then processed to yield range measurements using a dedicated Cromemco 2D microcomputer operating at 4 MHz. The microcomputer controls laser switching through a laser phase data collection, display of results, and system calibration. However, the rapid conversion of raw phase data into range with values good to 2 parts in $10^8$ per meter is the primary function of the microcomputer.

Phase information from each of the four color pairs (for both the target and reference ranges) is determined by phase meters 76 and 78 and stored in computer 80 as a fractional fringe number. From this phase information, fractional fringe values are then calculated for each successively higher level of the hierarchy pyramid. Having obtained a complete hierarchy of fractional fringes, range determination may be viewed as a process of successive approximation. The range is first determined at the longest wavelength (hierarchy Level 7) by determining the integral number of the whole fringes using fractional fringe data and an initial range estimate. This new range value is then used, along with the fractional fringe data from the next lower level, to determine a second range value. This process is repeated down through the hierachy until a final range value is determined at the 10 $\mu$m wavelenghts.

The final range value is good to 0.025 $\mu$m as long as the measurement accuracy (phase resolution) and the laser frequency stability are sufficient to correctly determine the integral number of whole fringes for each wavelength down through the hierarchy. Each wavelength transition in the hierarchy places different numerical criteria for measurement accuracy and laser stability on the system. These criteria were derived by assuming a total acceptable error of $\lambda/10$ for each wavelength, $\lambda_n$, in the hierarchy. The phase meters provide a measurement accuracy of $\pm 1.4 \times 10^{-3}$ fringe ($\pm 0.05$ degrees) which is double the most stringent measurement accuracy requirement at the $\lambda_2$ level in the hierarchy transition ($\pm 3.1 \times 10^3$ fringe). With range L set at 5 meters, an RMS laser stability of $\pm 140$ kHz is required. This, for contrast, is to be compared with the measured stability of the laboratory T-C laser 12, which is $\pm 35$ kHz.

The analysis up to this point has neglected any changes in optical length which occur during the collection of phase data. Small vibratory excursions do occur which result in inconsistent phase measurements. Phase measurements with a spread of greater than 3% may prevent accurate determination of the range. The role of simultaneous R- and P-line phase measurements in the reduction of system sensitivity to path length change has been analyzed. Results indicate a significant increase in synthetic wavelength phase measurement accuracy using simultaneous measurements. This increase in accuracy is proportional to the ratio of wavelengths between Level 1 and Level 2 of the hierarchy (approximately 35:1). The simultaneous measurement of color pairs provides improved Absolute Distance Sensor 10 with a crucial insensitivity to path length changes due to target vibration and atmospheric turbulence.

To experimentally obtain a measure of accuracy as well as determine its stability and general performance properties, comparison measurements were made using an HP Interferometer (Model 5525) as reference 74. In an effort to establish coincident measurement geometries the ADS and HP beams were accurately colocated, a common retroreflector target 70 was employed, and the target-to-reference distances were set nearly equal for the two systems.

Clearly, many modifications and variations of the present invention are possible in light of the above teachings and it is therefore understood, that within the inventive scope of the inventive concept, the invention may be practiced otherwise than specifically claimed.

What is claimed is:

1. An improved absolute distance sensor comprising:
   a two-color laser, said two-color laser being a laser operating simultaneously on a R-line and a P-line being a two-color pair, said laser selectively switching between a plurality of two-color pairs, each of said two-color pairs having at least one different line therein, said two-color laser outputting a carrier beam having said two-color pair therein;
   a computer, said computer determining said two-color pair to be output by said two-color laser;
   oscillator means for providing drive frequencies in response to an output from said computer;
   a controller, said controller connected to said two-color laser, said controller causing said two-color laser to switch through a selected group of said two-color pairs;
   a multi-frequency Bragg cell, said Bragg cell shifting the frequency of said carrier beam having said two-color pair therein, said Bragg cell outputting a plurality of beams, said beams having an R beam and a P beam colinear therein and being spectrally separated, one of said plurality of beams being an interferometer beam having a R beam and a P beam therein, another of said plurality of beams being a local oscillator beam having an R beam and a P beam therein, and another of said plurality of beams being a laser control beam for determining laser stabilization between R and P beam power, said local oscillator beam and said interferometer beam having frequencies on opposite sides of a frequency of said carrier beam, said Bragg cell being excited by a plurality of said drive frequencies from said oscillator means connected to said computer;
   means for stabilizing said two-color laser, said means for stabilizing receiving said laser control beam and outputting control signals to said computer;
   means for aligning and intensity adjusting said local oscillator beams and said interferometer beam;
   a synthetic Michelson interferometer for receiving said interferometer beam, said interferometer outputting alternatively a target return beam and a reference return beam;
   means for combining said return beams and said local oscillator beam;
   a detector responsive to changes in fringes of said return beams and said local oscillator beam; and
   means for determining phase between said local oscillator beams and said target return beams, said means for determining phase connected to receive signals from said detector and outputting a phase to said computer.

* * * * *